US009577346B2

(12) United States Patent
Shtrom et al.

(10) Patent No.: US 9,577,346 B2
(45) Date of Patent: Feb. 21, 2017

(54) VERTICAL MULTIPLE-INPUT MULTIPLE-OUTPUT WIRELESS ANTENNAS

(75) Inventors: Victor Shtrom, Los Altos, CA (US); Bernard Baron, Mountain View, CA (US)

(73) Assignee: RUCKUS WIRELESS, INC., Sunnyvale, CA (US)

( * ) Notice: Subject to any disclaimer, the term of this patent is extended or adjusted under 35 U.S.C. 154(b) by 781 days.

(21) Appl. No.: 12/212,855

(22) Filed: Sep. 18, 2008

(65) Prior Publication Data

US 2009/0075606 A1 Mar. 19, 2009

Related U.S. Application Data

(63) Continuation of application No. 11/938,240, filed on Nov. 9, 2007, now Pat. No. 7,646,343, which is a continuation-in-part of application No. 11/413,461, filed on Apr. 28, 2006, now Pat. No. 7,358,912.

(60) Provisional application No. 60/865,148, filed on Nov. 9, 2006, provisional application No. 60/694,101, filed on Jun. 24, 2005.

(51) Int. Cl.

| | |
|---|---|
| ***H04M 1/00*** | (2006.01) |
| ***H01Q 21/24*** | (2006.01) |
| ***H01Q 3/24*** | (2006.01) |
| ***H01Q 9/16*** | (2006.01) |
| ***H01Q 13/10*** | (2006.01) |

(Continued)

(52) U.S. Cl.

CPC .............. *H01Q 21/24* (2013.01); *H01Q 3/242* (2013.01); *H01Q 9/16* (2013.01); *H01Q 13/10* (2013.01); *H01Q 21/205* (2013.01); *H01Q 21/245* (2013.01); *H01Q 23/00* (2013.01)

(58) Field of Classification Search

USPC ...................................... 455/101, 129, 562.1

See application file for complete search history.

(56) References Cited

U.S. PATENT DOCUMENTS

| | | | |
|---|---|---|---|
| 723,188 | A | 3/1903 | Tesla |
| 725,605 | A | 4/1903 | Tesla |

(Continued)

FOREIGN PATENT DOCUMENTS

| | | | |
|---|---|---|---|
| CN | 103268980 | A | 8/2013 |
| EP | 352787 | A2 | 1/1990 |

(Continued)

OTHER PUBLICATIONS

Ken Tang, et al., “MAC Layer Broadcast Support in 802.11 Wireless Networks,” Computer Science Department, University of California, Los Angeles, 2000 IEEE, pp. 544-548.

(Continued)

*Primary Examiner* — Ping Hsieh

(74) *Attorney, Agent, or Firm* — Lewis Roca Rothgerber Christie LLP

(57) ABSTRACT

High gain, multi-pattern multiple-input multiple-output (MIMO) antenna systems are disclosed. These systems provide for multiple-polarization and omnidirectional coverage using multiple radios, which may be tuned to the same frequency. The MIMO antenna systems may include multiple high-gain beams arranged (or capable of being arranged) to provide for omnidirectional coverage. These systems provide for increased data throughput and reduced interference without sacrificing the benefits related to size and manageability of an associated access point.

21 Claims, 9 Drawing Sheets

(51) Int. Cl.
*H01Q 21/20* (2006.01)
*H01Q 23/00* (2006.01)

(56) References Cited

U.S. PATENT DOCUMENTS 1,869,659 A 8/1932 Broertjes
2,292,387 A 8/1942 Markey et al.
3,488,445 A 1/1970 Chang
3,568,105 A 3/1971 Felsenheld
3,918,059 A 11/1975 Adrian
3,922,685 A 11/1975 Opas
3,967,067 A 6/1976 Potter
3,982,214 A 9/1976 Burns
3,991,273 A 11/1976 Mathes
4,001,734 A 1/1977 Burns
4,176,356 A 11/1979 Foster et al.
4,193,077 A 3/1980 Greenberg et al.
4,253,193 A 2/1981 Kennard
4,305,052 A 12/1981 Baril et al.
4,513,412 A 4/1985 Cox
4,554,554 A 11/1985 Olesen et al.
4,733,203 A 3/1988 Ayasli
4,814,777 A 3/1989 Monser
4,845,507 A 7/1989 Archer et al.
5,063,574 A 11/1991 Moose
5,097,484 A 3/1992 Akaiwa
5,173,711 A 12/1992 Takeuchi et al.
5,203,010 A 4/1993 Felix
5,208,564 A 5/1993 Burns et al.
5,220,340 A 6/1993 Shafai
5,282,222 A 1/1994 Fattouche et al.
5,291,289 A 3/1994 Hulyalkar et al.
5,311,550 A 5/1994 Fouche et al.
5,373,548 A 12/1994 McCarthy
5,507,035 A 4/1996 Bantz
5,532,708 A 7/1996 Krenz et al.
5,559,800 A 9/1996 Mousseau et al.
5,610,617 A 3/1997 Gans et al.
5,629,713 A 5/1997 Mailandt et al.
5,754,145 A 5/1998 Evans
5,767,755 A 6/1998 Kim et al.
5,767,809 A 6/1998 Chuang et al.
5,786,793 A 7/1998 Maeda et al.
5,802,312 A 9/1998 Lazaridis et al.
5,964,830 A 10/1999 Durett
5,990,838 A 11/1999 Burns et al.
6,006,075 A 12/1999 Smith et al.
6,011,450 A 1/2000 Miya
6,018,644 A 1/2000 Minarik
6,031,503 A 2/2000 Preiss, II et al.
6,034,638 A 3/2000 Thiel et al.
6,052,093 A 4/2000 Yao et al.
6,091,364 A 7/2000 Murakami et al.
6,094,177 A * 7/2000 Yamamoto .................... 343/806
6,097,347 A 8/2000 Duan et al.
6,101,397 A 8/2000 Grob et al.
6,104,356 A 8/2000 Hikuma et al.
6,169,523 B1 1/2001 Ploussios
6,266,528 B1 7/2001 Farzaneh
6,292,153 B1 9/2001 Aiello et al.
6,307,524 B1 10/2001 Britain
6,317,599 B1 11/2001 Rappaport et al.
6,323,810 B1 11/2001 Poilasne et al.
6,326,922 B1 12/2001 Hegendoerfer
6,337,628 B2 1/2002 Campana, Jr.
6,337,668 B1 * 1/2002 Ito et al. ....................... 343/833
6,339,404 B1 1/2002 Johnson et al.
6,345,043 B1 2/2002 Hsu
6,356,242 B1 3/2002 Ploussios
6,356,243 B1 3/2002 Schneider et al.
6,356,905 B1 3/2002 Gershman et al.
6,377,227 B1 4/2002 Zhu et al.
6,392,610 B1 5/2002 Braun et al.
6,404,386 B1 6/2002 Proctor, Jr. et al.
6,407,719 B1 6/2002 Ohira et al.
RE37,802 E 7/2002 Fattouche et al.
6,414,647 B1 7/2002 Lee
6,424,311 B1 7/2002 Tsai et al.
6,442,507 B1 8/2002 Skidmore et al.
6,445,688 B1 9/2002 Garces et al.
6,452,981 B1 9/2002 Raleigh
6,456,242 B1 9/2002 Crawford
6,493,679 B1 12/2002 Rappaport et al.
6,496,083 B1 12/2002 Kushitani et al.
6,498,589 B1 12/2002 Horii
6,499,006 B1 12/2002 Rappaport et al.
6,507,321 B2 1/2003 Oberschmidt et al.
6,531,985 B1 3/2003 Jones et al.
6,583,765 B1 6/2003 Schamberger et al.
6,586,786 B2 7/2003 Kitazawa et al.
6,611,230 B2 8/2003 Phelan
6,621,464 B1 9/2003 Fang
6,625,454 B1 9/2003 Rappaport et al.
6,633,206 B1 10/2003 Kato
6,642,889 B1 11/2003 McGrath
6,674,459 B2 1/2004 Ben-Shachar et al.
6,701,522 B1 3/2004 Rubin et al.
6,724,346 B2 4/2004 Le Bolzer
6,725,281 B1 4/2004 Zintel et al.
6,741,219 B2 5/2004 Shor
6,747,605 B2 6/2004 Lebaric
6,753,814 B2 6/2004 Killen et al.
6,762,723 B2 7/2004 Nallo et al.
6,774,846 B2 8/2004 Fullerton et al.
6,779,004 B1 8/2004 Zintel
6,801,790 B2 10/2004 Rudrapatna
6,819,287 B2 11/2004 Sullivan et al.
6,839,038 B2 1/2005 Weinstein
6,859,176 B2 2/2005 Choi
6,859,182 B2 2/2005 Horii
6,876,280 B2 4/2005 Nakano
6,876,836 B2 4/2005 Lin et al.
6,888,504 B2 5/2005 Chiang et al.
6,888,893 B2 5/2005 Li et al.
6,892,230 B1 5/2005 Gu et al.
6,903,686 B2 6/2005 Vance et al.
6,906,678 B2 6/2005 Chen
6,910,068 B2 6/2005 Zintel et al.
6,914,581 B1 7/2005 Popek
6,924,768 B2 8/2005 Wu et al.
6,931,429 B2 8/2005 Gouge et al.
6,941,143 B2 9/2005 Mathur
6,943,749 B2 9/2005 Paun
6,950,019 B2 9/2005 Bellone et al.
6,950,069 B2 9/2005 Gaucher et al.
6,961,026 B2 11/2005 Toda
6,961,028 B2 11/2005 Joy et al.
6,965,353 B2 11/2005 Shirosaka et al.
6,973,622 B1 12/2005 Rappaport et al.
6,975,834 B1 12/2005 Forster
6,980,782 B1 12/2005 Braun et al.
7,023,909 B1 4/2006 Adams et al.
7,034,769 B2 4/2006 Surducan et al.
7,034,770 B2 4/2006 Yang et al.
7,039,363 B1 5/2006 Kasapi et al.
7,043,277 B1 5/2006 Pfister
7,050,809 B2 5/2006 Lim
7,053,844 B2 5/2006 Gaucher et al.
7,064,717 B2 6/2006 Kaluzni et al.
7,075,485 B2 7/2006 Song et al.
7,084,823 B2 * 8/2006 Caimi et al. .................. 343/742
7,085,814 B1 8/2006 Ghandi et al.
7,088,299 B2 8/2006 Siegler et al.
7,089,307 B2 8/2006 Zintel et al.
7,130,895 B2 10/2006 Zintel et al.
7,171,475 B2 1/2007 Weisman et al.
7,193,562 B2 3/2007 Shtrom et al.
7,277,063 B2 10/2007 Shirosaka et al.
7,308,047 B2 * 12/2007 Sadowsky ..................... 375/324
7,312,762 B2 12/2007 Puente Ballarda et al.
7,319,432 B2 1/2008 Andersson
7,362,280 B2 * 4/2008 Shtrom et al. ................ 343/795
7,424,298 B2 9/2008 Lastinger et al.
7,493,143 B2 2/2009 Jalali

(56) References Cited

U.S. PATENT DOCUMENTS

| | | | |
|---|---|---|---|
| 7,498,996 B2* | 3/2009 | Shtrom et al. | 343/795 |
| 7,525,486 B2 | 4/2009 | Shtrom et al. | |
| 7,603,141 B2* | 10/2009 | Dravida | 455/562.1 |
| 7,646,343 B2 | 1/2010 | Shtrom et al. | |
| 7,675,474 B2 | 3/2010 | Shtrom et al. | |
| 7,696,943 B2* | 4/2010 | Chiang | 343/833 |
| 7,880,683 B2 | 2/2011 | Shtrom et al. | |
| 7,899,497 B2* | 3/2011 | Kish et al. | 455/562.1 |
| 7,965,252 B2* | 6/2011 | Shtrom et al. | 343/795 |
| 8,031,129 B2 | 10/2011 | Shtrom et al. | |
| 2001/0046848 A1 | 11/2001 | Kenkel | |
| 2002/0031130 A1 | 3/2002 | Tsuchiya et al. | |
| 2002/0047800 A1 | 4/2002 | Proctor, Jr. et al. | |
| 2002/0054580 A1 | 5/2002 | Strich et al. | |
| 2002/0080767 A1 | 6/2002 | Lee | |
| 2002/0084942 A1 | 7/2002 | Tsai et al. | |
| 2002/0084943 A1 | 7/2002 | Tsai et al. | |
| 2002/0101377 A1 | 8/2002 | Crawford | |
| 2002/0105471 A1 | 8/2002 | Kojima et al. | |
| 2002/0112058 A1 | 8/2002 | Weisman et al. | |
| 2002/0158798 A1 | 10/2002 | Chiang et al. | |
| 2002/0170064 A1 | 11/2002 | Monroe et al. | |
| 2003/0026240 A1 | 2/2003 | Eyuboglu et al. | |
| 2003/0030588 A1 | 2/2003 | Kalis et al. | |
| 2003/0063591 A1 | 4/2003 | Leung et al. | |
| 2003/0122714 A1 | 7/2003 | Wannagot et al. | |
| 2003/0169330 A1 | 9/2003 | Ben-Shachar et al. | |
| 2003/0184490 A1 | 10/2003 | Raiman et al. | |
| 2003/0189514 A1 | 10/2003 | Miyano et al. | |
| 2003/0189521 A1 | 10/2003 | Yamamoto et al. | |
| 2003/0189523 A1 | 10/2003 | Ojantakanen et al. | |
| 2003/0210207 A1 | 11/2003 | Suh et al. | |
| 2003/0227414 A1 | 12/2003 | Saliga et al. | |
| 2004/0014432 A1 | 1/2004 | Boyle | |
| 2004/0017310 A1 | 1/2004 | Runkle et al. | |
| 2004/0017860 A1 | 1/2004 | Liu | |
| 2004/0027291 A1 | 2/2004 | Zhang et al. | |
| 2004/0027304 A1 | 2/2004 | Chiang et al. | |
| 2004/0032378 A1 | 2/2004 | Volman et al. | |
| 2004/0036651 A1 | 2/2004 | Toda | |
| 2004/0036654 A1 | 2/2004 | Hsieh | |
| 2004/0041732 A1 | 3/2004 | Aikawa et al. | |
| 2004/0048593 A1 | 3/2004 | Sano | |
| 2004/0058690 A1 | 3/2004 | Ratzel et al. | |
| 2004/0061653 A1 | 4/2004 | Webb et al. | |
| 2004/0070543 A1 | 4/2004 | Masaki | |
| 2004/0080455 A1 | 4/2004 | Lee | |
| 2004/0080456 A1* | 4/2004 | Tran | H01Q 3/24<br>343/700 MS |
| 2004/0095278 A1 | 5/2004 | Kanemoto et al. | |
| 2004/0114535 A1 | 6/2004 | Hoffmann et al. | |
| 2004/0125777 A1 | 7/2004 | Doyle et al. | |
| 2004/0137864 A1 | 7/2004 | Hwang | |
| 2004/0145528 A1 | 7/2004 | Mukai et al. | |
| 2004/0160376 A1 | 8/2004 | Hornsby et al. | |
| 2004/0190477 A1 | 9/2004 | Olson et al. | |
| 2004/0203347 A1 | 10/2004 | Nguyen | |
| 2004/0227669 A1 | 11/2004 | Okado | |
| 2004/0260800 A1 | 12/2004 | Gu et al. | |
| 2005/0003865 A1* | 1/2005 | Lastinger et al. | 455/562.1 |
| 2005/0022210 A1 | 1/2005 | Zintel et al. | |
| 2005/0041739 A1 | 2/2005 | Li et al. | |
| 2005/0042988 A1 | 2/2005 | Hoek et al. | |
| 2005/0048934 A1 | 3/2005 | Rawnick et al. | |
| 2005/0074018 A1 | 4/2005 | Zintel et al. | |
| 2005/0097503 A1 | 5/2005 | Zintel et al. | |
| 2005/0104777 A1* | 5/2005 | Smith | H01Q 1/084<br>343/700 MS |
| 2005/0105632 A1 | 5/2005 | Catreux-Erces et al. | |
| 2005/0128983 A1 | 6/2005 | Kim et al. | |
| 2005/0135480 A1 | 6/2005 | Li et al. | |
| 2005/0138137 A1 | 6/2005 | Encarnacion et al. | |
| 2005/0138193 A1 | 6/2005 | Encarnacion et al. | |
| 2005/0146475 A1 | 7/2005 | Bettner et al. | |
| 2005/0180381 A1 | 8/2005 | Retzer et al. | |
| 2005/0188193 A1 | 8/2005 | Kuehnel et al. | |
| 2005/0226277 A1* | 10/2005 | Li et al. | 370/536 |
| 2005/0240665 A1 | 10/2005 | Gu et al. | |
| 2005/0266902 A1 | 12/2005 | Khatri | |
| 2005/0267935 A1 | 12/2005 | Gandhi et al. | |
| 2006/0007891 A1 | 1/2006 | Aoki et al. | |
| 2006/0038734 A1 | 2/2006 | Shtrom et al. | |
| 2006/0050005 A1 | 3/2006 | Shirosaka et al. | |
| 2006/0078066 A1 | 4/2006 | Yun | |
| 2006/0094371 A1 | 5/2006 | Nguyen | |
| 2006/0098607 A1 | 5/2006 | Zeng et al. | |
| 2006/0105730 A1* | 5/2006 | Modonesi et al. | 455/273 |
| 2006/0120311 A1* | 6/2006 | Berkovich | 370/310 |
| 2006/0123124 A1 | 6/2006 | Weisman et al. | |
| 2006/0123125 A1 | 6/2006 | Weisman et al. | |
| 2006/0123455 A1 | 6/2006 | Pai et al. | |
| 2006/0160495 A1 | 7/2006 | Strong | |
| 2006/0168159 A1 | 7/2006 | Weisman et al. | |
| 2006/0184660 A1 | 8/2006 | Rao et al. | |
| 2006/0184661 A1 | 8/2006 | Weisman et al. | |
| 2006/0184693 A1 | 8/2006 | Rao et al. | |
| 2006/0224690 A1 | 10/2006 | Falkenburg et al. | |
| 2006/0225107 A1 | 10/2006 | Seetharaman et al. | |
| 2006/0227761 A1 | 10/2006 | Scott, III et al. | |
| 2006/0239369 A1 | 10/2006 | Lee | |
| 2006/0262015 A1 | 11/2006 | Thornell-Pers et al. | |
| 2006/0291434 A1 | 12/2006 | Gu et al. | |
| 2007/0027622 A1 | 2/2007 | Cleron et al. | |
| 2007/0135167 A1 | 6/2007 | Liu | |
| 2007/0162819 A1 | 7/2007 | Kawamoto | |
| 2011/0205137 A1 | 8/2011 | Shtrom et al. | |
| 2015/0311599 A1 | 10/2015 | Shtrom et al. | |

FOREIGN PATENT DOCUMENTS

| | | |
|---|---|---|
| EP | 0 534 612 | 3/1993 |
| EP | 0756381 A2 | 1/1997 |
| EP | 1152542 A1 | 11/2001 |
| EP | 1 376 920 | 6/2002 |
| EP | 1 220 461 | 7/2002 |
| EP | 1 315 311 | 5/2003 |
| EP | 1 450 521 | 8/2004 |
| EP | 1 608 108 | 12/2005 |
| EP | 1 152 453 | 11/2011 |
| EP | 1 964 209 | 2/2015 |
| JP | 03038933 | 2/1991 |
| JP | 2008/088633 | 2/1996 |
| JP | 11215040 A1 | 8/1999 |
| JP | 2001/05760 | 1/2001 |
| JP | 2001/057560 | 2/2002 |
| JP | 2005/354249 | 12/2005 |
| JP | 2006/060408 | 3/2006 |
| WO | WO 90/04893 | 5/1990 |
| WO | WO9837590 A2 | 8/1998 |
| WO | WO 02/25967 | 3/2002 |
| WO | WO 03/079484 | 9/2003 |
| WO | WO 2006/023247 | 3/2006 |
| WO | WO 2007/076105 | 5/2007 |

OTHER PUBLICATIONS

Ken Tang, et al., "MAC Reliable Broadcast in Ad Hoc Networks," Computer Science Department, University of California, Los Angeles, 2001 IEEE, pp. 1008-1013.

Vincent D. Park, et al., "A Performance Comparison of the Temporally-Ordered Routing Algorithm and Ideal Link-State Routing," IEEE, Jul. 1998, pp. 592-598.

Ian F. Akyildiz, et al., "A Virtual Topology Based Routing Protocol for Multihop Dynamic Wireless Networks," Broadband and Wireless Networking Lab, School of Electrical and Computer Engineering, Georgia Institute of Technology.

Dell Inc., "How Much Broadcast and Multicast Traffic Should I Allow in My Network," PowerConnect Application Note #5, Nov. 2003.

Toskala, Antti, "Enhancement of Broadcast and Introduction of Multicast Capabilities in RAN," Nokia Networks, Palm Springs, California, Mar. 13-16, 2001.

(56) References Cited

OTHER PUBLICATIONS

Microsoft Corporation, "IEEE 802.11 Networks and Windows XP," Windows Hardware Developer Central, Dec. 4, 2001.
Festag, Andreas, "What is Mombasa?" Telecommunication Networks Group (TKN), Technical University of Berlin, Mar. 7, 2002.
Hewlett Packard, "HP ProCurve Networking: Enterprise Wireless LAN Networking and Mobility Solutions," 2003.
Dutta, Ashutosh et al., "MarconiNet Supporting Streaming Media Over Localized Wireless Multicast," Proc. of the 2d Int'l Workshop on Mobile Commerce, 2002.
Dunkels, Adam et al., "Making TCP/IP Viable for Wireless Sensor Networks," Proc. of the 1st Euro. Workshop on Wireless Sensor Networks, Berlin, Jan. 2004.
Dunkels, Adam et al., "Connecting Wireless Sensornets with TCP/IP Networks," Proc. of the 2d Int'l Conf. on Wired Networks, Frankfurt, Feb. 2004.
Cisco Systems, "Cisco Aironet Access Point Software Configuration Guide: Configuring Filters and Quality of Service," Aug. 2003.
Hirayama, Koji et al., "Next-Generation Mobile-Access IP Network," Hitachi Review vol. 49, No. 4, 2000.
Pat Calhoun et al., "802.11r strengthens wireless voice," Technology Update, Network World, Aug. 22, 2005, http://www.networkworld.com/news/tech/2005/082208techupdate.html.
Areg Alimian et al., "Analysis of Roaming Techniques," doc.:IEEE 802.11-04/0377r1, Submission, Mar. 2004.
Information Society Technologies Ultrawaves, "System Concept / Architecture Design and Communication Stack Requirement Document," Feb. 23, 2004.
Golmie, Nada, "Coexistence in Wireless Networks: Challenges and System-Level Solutions in the Unlicensed Bands," Cambridge University Press, 2006.
Mawa, Rakesh, "Power Control in 3G Systems," Hughes Systique Corporation, Jun. 28, 2006.
Wennstrom, Mattias et al., "Transmit Antenna Diversity in Ricean Fading MIMO Channels with Co-Channel Interference," 2001.
"Authorization of Spread Spectrum Systems Under Parts 15 and 90 of the FCC Rules and Regulations," Rules and Regulations Federal Communications Commission, 47 CFR Part 2, 15, and 90, Jun. 18, 1985.
"Authorization of spread spectrum and other wideband emissions not presently provided for in the FCC Rules and Regulations," Before the Federal Communications Commission, FCC 81-289, 87 F.C.C.2d 876, Jun. 30, 1981.
RL Miller, "4.3 Project X-A True Secrecy System for Speech," Engineering and Science in the Bell System, A History of Engineering and Science in the Bell System National Service in War and Peace (1925-1975), pp. 296-317, 1978, Bell Telephone Laboratories, Inc.
Chang, Robert W., "Synthesis of Band-Limited Orthogonal Signals for Multichannel Data Transmission," The Bell System Technical Journal, Dec. 1966, pp. 1775-1796.
Cimini, Jr., Leonard J, "Analysis and Simulation of a Digital Mobile Channel Using Orthogonal Frequency Division Multiplexing," IEEE Transactions on Communications, vol. Com-33, No. 7, Jul. 1985, pp. 665-675.
Saltzberg, Burton R., "Performance of an Efficient Parallel Data Transmission System," IEEE Transactions on Communication Technology, vol. Com-15, No. 6, Dec. 1967, pp. 805-811.
Weinstein, S. B., et al., "Data Transmission by Frequency-Division Multiplexing Using the Discrete Fourier Transform," IEEE Transactions on Communication Technology, vol. Com-19, No. 5, Oct. 1971, pp. 628-634.
Moose, Paul H., "Differential Modulation and Demodulation of Multi-Frequency Digital Communications Signals," 1990 IEEE,CH2831-6/90/0000-0273.
Casas, Eduardo F., et al., "OFDM for Data Communication Over Mobile Radio FM Channels-Part I: Analysis and Experimental Results," IEEE Transactions on Communications, vol. 39, No. 5, May 1991, pp. 783-793.
Casas, Eduardo F., et al., "OFDM for Data Communication over Mobile Radio FM Channels; Part II: Performance Improvement," Department of Electrical Engineering, University of British Columbia.
Chang, Robert W., et al., "A Theoretical Study of Performance of an Orthogonal Multiplexing Data Transmission Scheme," IEEE Transactions on Communication Technology, vol. Com-16, No. 4, Aug. 1968, pp. 529-540.
Gledhill, J. J., et al., "The Transmission of Digital Television in the UHF Band Using Orthogonal Frequency Division Multiplexing," Sixth International Conference on Digital Processing of Signals in Communications, Sep. 2-6, 1991, pp. 175-180.
Alard, M., et al., "Principles of Modulation and Channel Coding for Digital Broadcasting for Mobile Receivers," 8301 EBU Review Technical, Aug. 1987, No. 224, Brussels, Belgium.
Berenguer, Inaki, et al., "Adaptive MIMO Antenna Selection," Nov. 2003.
Gaur, Sudhanshu, et al., "Transmit/Receive Antenna Selection for MIMO Systems to Improve Error Performance of Linear Receivers," School of ECE, Georgia Institute of Technology, Apr. 4, 2005.
Sadek, Mirette, et al., "Active Antenna Selection in Multiuser MIMO Communications," IEEE Transactions on Signal Processing, vol. 55, No. 4, Apr. 2007, pp. 1498-1510.
Molisch, Andreas F., et al., "MIMO Systems with Antenna Selection—an Overview," Draft, Dec. 31, 2003.
Steger, Christopher et al., "Performance of IEEE 802.11b Wireless LAN in an Emulated Mobile Channel," 2003.
Chang, Nicholas B. et al., "Optimal Channel Probing and Transmission Scheduling for Opportunistics Spectrum Access," Sep. 2007.
Tsunekawa, Kouichi, "Diversity Antennas for Portable Telephones," 39th IEEE Vehicular Technology Conference, pp. 50-56, vol. I, Gateway to New Concepts in Vehicular Technology, May 1-3, 1989, San Francisco, CA.
Ando et al., "Study of Dual-Polarized Omni-Directional Antennas for 5.2 GHz-Band 2x2 MIMO-OFDM Systems," Antennas and Propogation Society International Symposium, 2004, IEEE, pp. 1740-1743 vol. 2.
Bedell, Paul, "Wireless Crash Course," 2005, p. 84, The McGraw-Hill Companies, Inc., USA.
Petition Decision Denying Request to Order Additional Claims for U.S. Pat. No. 7,193,562 (U.S. Appl. No. 95/001,078) mailed on Jul. 10, 2009.
Right of Appeal Notice for U.S. Pat. No. 7,193,562 (Control No. 95/001078) mailed on Jul. 10, 2009.
Tsunekawa, Kouichi "Diversity Antennas for Portable Telephones," 39th IEEE Vehicular Technology, May 1-3, 1989, San Francisco, CA.
U.S. Appl. No. 95/001,078, filed Sep. 4, 2008.
U.S. Appl. No. 95/001,079, filed Sep. 4, 2008.
U.S. Appl. No. 12/018,894, Office Action mailed Sep. 9, 2009.
Antenna Polarization, Jul. 2010, pp. 55-56.
Antenna Polarization Vertical Horizontal Circular Polarization, Aston Wireless, No Date, pp. 1-3.
Polarization (waves), Wikipedia, No Date, pp. 1-20.
U.S. Appl. No. 13/019,214, Final Office Action mailed Mar. 17, 2014.
U.S. Appl. No. 13/019,214, Office Action mailed Sep. 9, 2013.
U.S. Appl. No. 13/019,214, Office Action mailed May 8, 2013.
Chinese Patent Application No. 200680048001.7 Second Office Action dated Jun. 20, 2012.
Chinese Patent Application No. 200680048001.7 First Office Action dated May 25, 2011.
European Patent Application No. 06848122.5 European Supplementary Search Report Mar. 12, 2010.
European Patent Application No. 06848122.5 Extended European Search Report Feb. 23, 2010.
PCT Application No. PCT/US2006/049211 International Search Report and Written Opinion dated Aug. 29, 2008.
U.S. Appl. No. 13/019,214, Office Action mailed Jul. 11, 2014.
Chinese Patent Application No. 201310130004.7 First Office Action dated Sep. 19, 2014.
U.S. Appl. No. 13/019,214, Final Office Action mailed Jan. 8, 2015.

(56) References Cited

OTHER PUBLICATIONS

Chinese Patent Application No. 201310130004.7 Second Office Action dated Jul. 29, 2015.
Supplementary European Search Report for foreign application No. EP07755519 dated Mar. 11, 2009.
Chuang et al., A 2.4 GHz Polarization-diversity Planar Printed Dipole Antenna for WLAN and Wireless Communication Applications, Microwave Journal, vol. 45, No. 6, pp. 50-62 (Jun. 2002).
Frederick et al., Smart Antennas Based on Spatial Multiplexing of Local Elements (SMILE) for Mutual Coupling Reduction, IEEE Transactions of Antennas and Propogation, vol. 52., No. 1, pp. 106-114 (Jan. 2004).
W.E. Doherty, Jr. et al., The Pin Diode Circuit Designer's Handbook (1998).
Varnes et al., A Switched Radial Divider for an L-Band Mobile Satellite Antenna, European Microwave Conference (Oct. 1995), pp. 1037-1041.
English Translation of PCT Pub. No. WO2004/051798 (as filed U.S. Appl. No. 10/536,547).
Behdad et al., Slot Antenna Miniaturization Using Distributed Inductive Loading, Antenna and Propagation Society International Symposium, 2003 IEEE, vol. 1, pp. 308-311 (Jun. 2003).
Press Release, NETGEAR RangeMax(TM) Wireless Networking Solutions Incorporate Smart MIMO Technology to Eliminate Wireless Dead Spots and Take Consumers Farther, Ruckus Wireles Inc. (Mar. 7, 2005), available at http://ruckuswireless.com/press/releases/20050307.php.

* cited by examiner

VERTICAL MULTIPLE-INPUT MULTIPLE-OUTPUT WIRELESS ANTENNAS

CROSS-REFERENCE TO RELATED APPLICATIONS

This application is a continuation and claims the priority benefit of U.S. patent application Ser. No. 11/938,240 filed Nov. 9, 2007 now U.S. Pat. No. 7,646,343 and entitled "Multiple-Input Multiple-Output Wireless Antennas," which claims the priority benefit of U.S. provisional patent application No. 60/865,148 filed Nov. 9, 2006 and entitled "Multiple Input Multiple Output (MIMO) Antenna Configurations"; U.S. patent application Ser. No. 11/938,240 is also a continuation-in-part and claims the priority benefit of U.S. patent application Ser. No. 11/413,461 filed Apr. 28, 2006 now U.S. Pat. No. 7,358,912 and entitled "Coverage Antenna with Selectable Horizontal and Vertical Polarization Elements," which claims the priority benefit of U.S. provisional patent application No. 60/694,101 filed Jun. 24, 2005. The disclosure of each of the aforementioned applications is incorporated herein by reference.

This application is related to U.S. patent application Ser. No. 11/041,145 entitled "System and Method for a Minimized Antenna Apparatus with Selectable Elements"; U.S. patent application Ser. No. 11/022,080 entitled "Circuit Board having a Peripheral Antenna Apparatus with Selectable Antenna Elements"; U.S. patent application Ser. No. 11/010,076 entitled "System and Method for an Omnidirectional Planar Antenna Apparatus with Selectable Elements"; U.S. patent application Ser. No. 11/180,329 entitled "System and Method for Transmission Parameter Control for an Antenna Apparatus with Selectable Elements"; U.S. patent application Ser. No. 11/190,288 entitled "Wireless System Having Multiple Antennas and Multiple Radios"; and U.S. patent application Ser. No. 11/646,136 entitled "Antennas with Polarization Diversity." The disclosure of each of the aforementioned applications is also incorporated herein by reference.

BACKGROUND OF INVENTION

Field of the Invention

The present invention generally relates to wireless communications. More specifically, the present invention relates to multiple-input multiple-output (MIMO) wireless antennas.

Description of the Prior Art

In wireless communications systems, there is an ever-increasing demand for higher data throughput and a corresponding drive to reduce interference that can disrupt data communications. For example, a wireless link in an Institute of Electrical and Electronic Engineers (IEEE) 802.11 network may be susceptible to interference from other access points and stations, other radio transmitting devices, and changes or disturbances in the wireless link environment between an access point and remote receiving node. In some instances, the interference may degrade the wireless link thereby forcing communication at a lower data rate. The interface may, however, be sufficiently strong as to disrupt the wireless link altogether.

One solution is to utilize a diversity antenna scheme. In such a solution, a data source is coupled to two or more physically separated omnidirectional antennas. An access point may select one of the omnidirectional antennas by which to maintain a wireless link. Because of the separation between the omnidirectional antennas, each antenna experiences a different signal environment and corresponding interference level with respect to the wireless link. A switching network couples the data source to whichever of the omnidirectional antennas experiences the least interference in the wireless link.

Diversity schemes are generally lacking in that typical omnidirectional antennas are vertically polarized. Vertically polarized radio frequency energy does not travel as efficiently as horizontally polarized energy with respect to a typical wireless environment (e.g., a home or office). Omnidirectional antennas also generally include an upright 'wand' attached to the access point. These wands are easily susceptible to breakage or damage. Omnidirectional antennas in a diversity scheme, too, may create interference amongst one another or be subject to the same interference source due to their physical proximity. As such, a diversity antenna scheme may fail to effectively reduce interference in a wireless link.

An alternative to a diversity antenna scheme involves beam steering of a controlled phase array antenna. A phased array antenna includes multiple stationary antenna elements that employ variable phase or time-delay control at each element to steer a beam to a given angle in space (i.e., beam steering). Phased array antennas are prohibitively expensive to manufacture. Phased array antennas, too, require a series of complicated phase tuning elements that may easily drift or otherwise become maladjusted over time.

Another attempt to improve the spectral efficiency of a wireless link includes the use of MIMO antenna architecture in an access point and/or receiving node. In a typical MIMO approach, multiple signals (two or more radio waveforms) are generated and transmitted in a single channel between the access point and the remote receiving node. FIG. 1 illustrates an exemplary access point 100 for a MIMO antenna system having two parallel baseband-to-RF transceiver ("radio") chains 110 and 111 as may be found in the prior art.

Data received into the access point 100 from, for example, a router connected to the Internet is encoded by a data encoder 105. Encoder 105 encodes the data into baseband signals for transmission to a MIMO-enabled remote receiving node. The parallel radio chains 110 and 111 generate two radio waveforms by digital-to-analog (D/A) conversion and upconversion. Upconversion may occur through the use of an oscillator driving a mixer and filter.

Each radio chain 110 and 111 in FIG. 1 is connected to an omnidirectional antenna (120 and 121, respectively). As with a diversity scheme, the omnidirectional antennas 120 and 121 may be spaced as far apart as possible from each other or at different polarizations and mounted to a housing of the access point 100. The two radio waveforms are simultaneously transmitted, affected by various multipath perturbations between the access point 100 and the MIMO-enabled remote receiving node, and then received and decoded by appropriate receiving circuits in the remote receiving node.

Prior art MIMO antenna systems tend to use a number of whip antennas for a number of transmission side radios. The large number of whip antennas used in a prior art MIMO antenna system not only increase the probability that one or more of the antennas may be damaged during use but also creates unsightly 'antenna farms.' Such 'farms' are generally unsuitable for home or business applications where access points are generally desired, if not needed, to be as small and unobtrusive as possible.

There remains a need in the art for wireless communication providing increased data throughput and reduced interference. An access point offering said benefits should do so without sacrificing corresponding benefits related to size or manageability of the access point.

SUMMARY OF THE INVENTION

MIMO wireless technology uses multiple antennas at the transmitter and receiver to produce capacity gains over single-input single-output (SISO) systems using the same or approximately equivalent bandwidth and transmit power. The capacity of a MIMO system generally increases linearly with the number of antennas in the presence of a scattering-rich environment. MIMO antenna design reduces correlation between received signals by exploiting various forms of diversity that arise due to the presence of multiple antennas.

DETAILED DESCRIPTION

Embodiments of the present invention provide for high gain, multi-pattern MIMO antenna systems and antenna apparatus. These systems and apparatus may provide for multiple-polarization and omnidirectional coverage using multiple radios, which may be tuned to the same frequency. A MIMO antenna system or apparatus may be capable of generating a high-gain radiation pattern in a similar direction but having different polarizations. Each polarization may be communicatively coupled to a different radio. The antenna systems and apparatus may further be capable of generating high-gain patterns in different directions and that have different polarizations.

Figure 8:
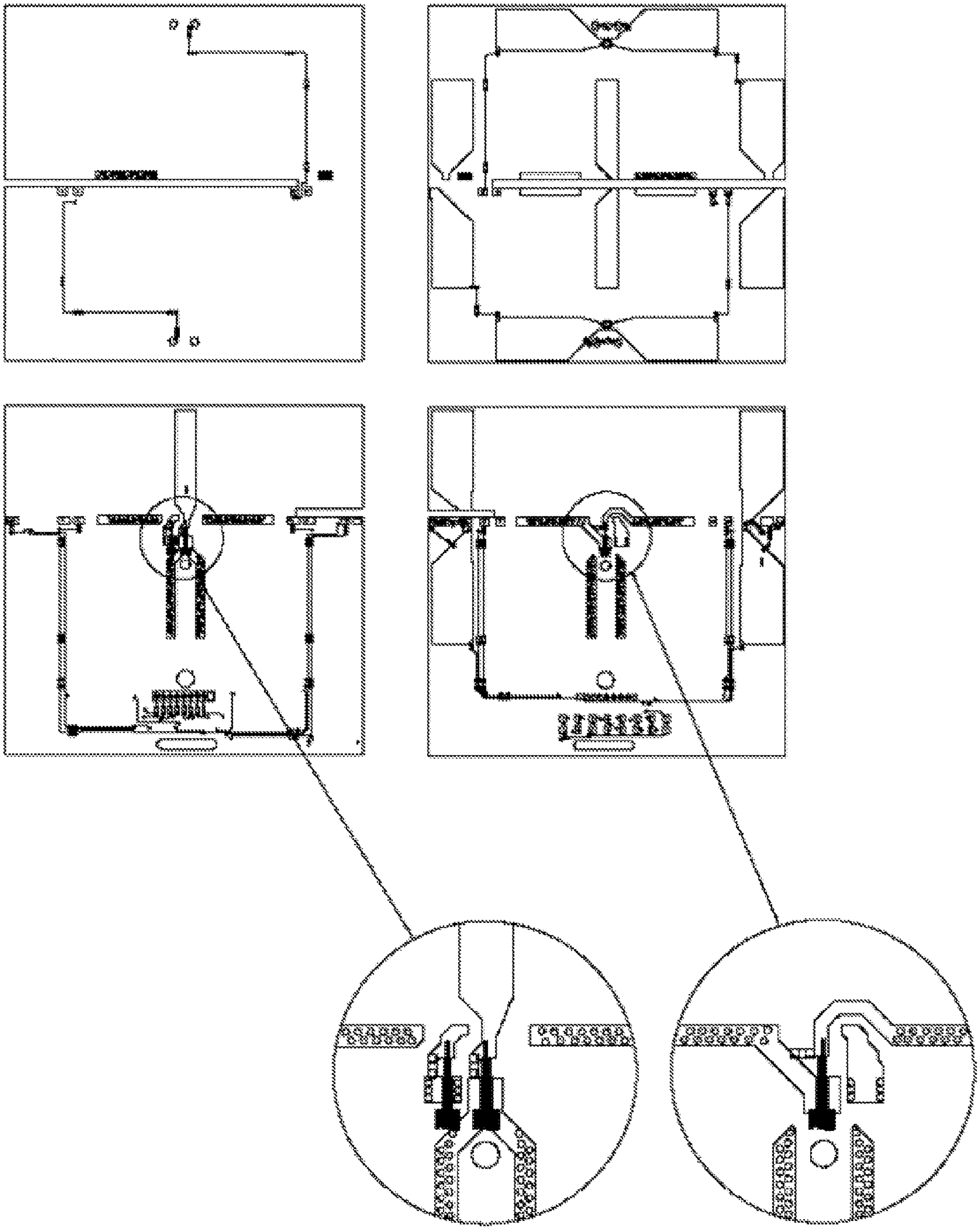
FIG. 8 illustrates a 'pigtail' and associated switches that may be used to allow for a single antenna to feed a series of RF chains.

Embodiments may utilize one or more of three orthogonally located dipoles (and any related p-type, intrinsic, n-type (PIN) diodes) along the x-y-z-axes (as appropriate). The dipoles may be printed or fed and, in some embodiments, embedded in multilayer boards. Dipoles may be associated with reflector/director elements and the antenna may offer gain in all directions at differing polarizations. Each of the three dipoles may produce its own high gain pattern. A single antenna may feed a series of RF chains (e.g., 3 chains) utilizing, for example, a pigtail and associated switches like that shown in FIG. 8.

Figure 1:
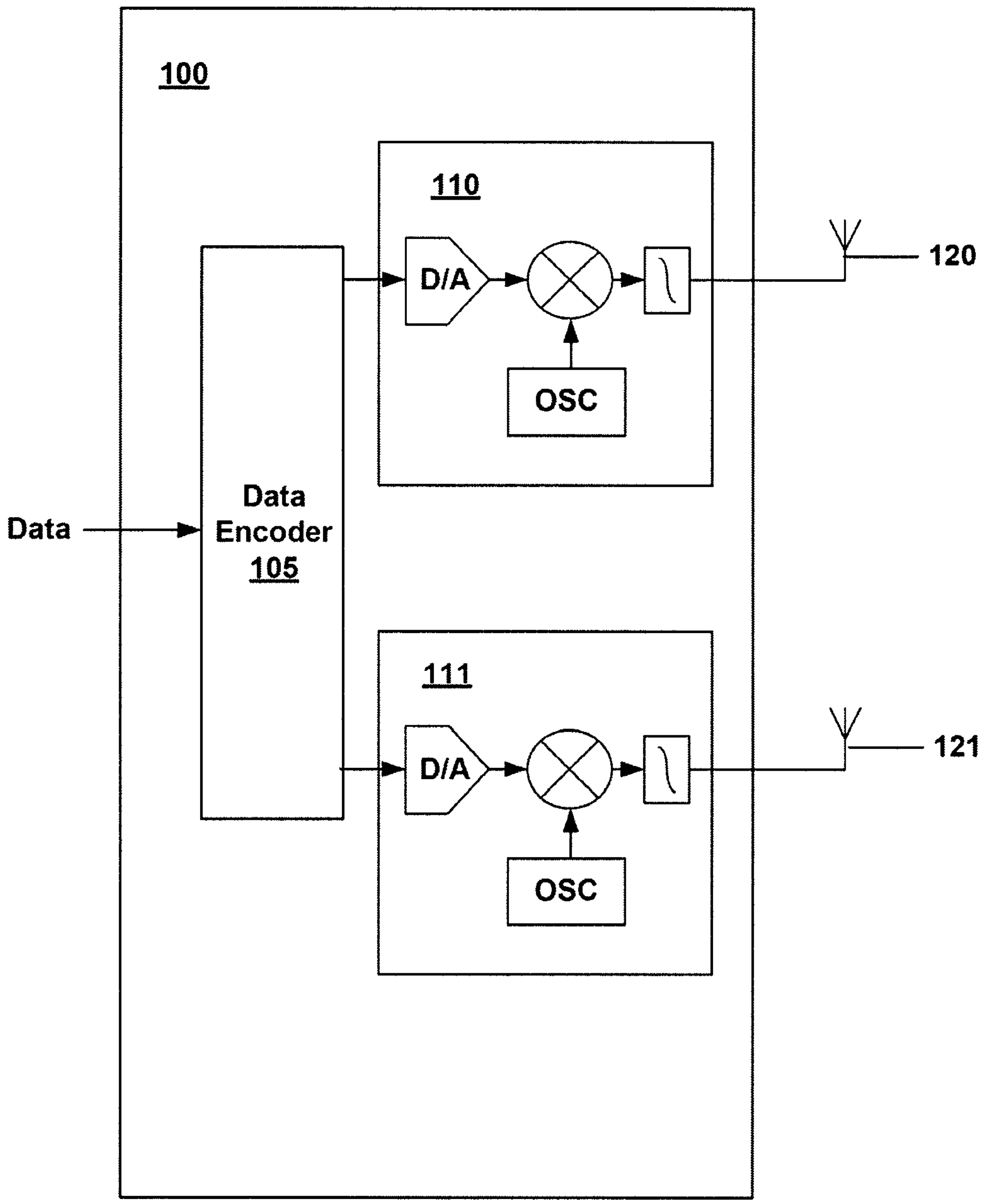
FIGURE 1 PRIOR ART
FIG. 1 illustrates an exemplary access point for a MIMO antenna system having two parallel baseband-to-RF transceiver chains as may be found in the prior art.
Figure 2:
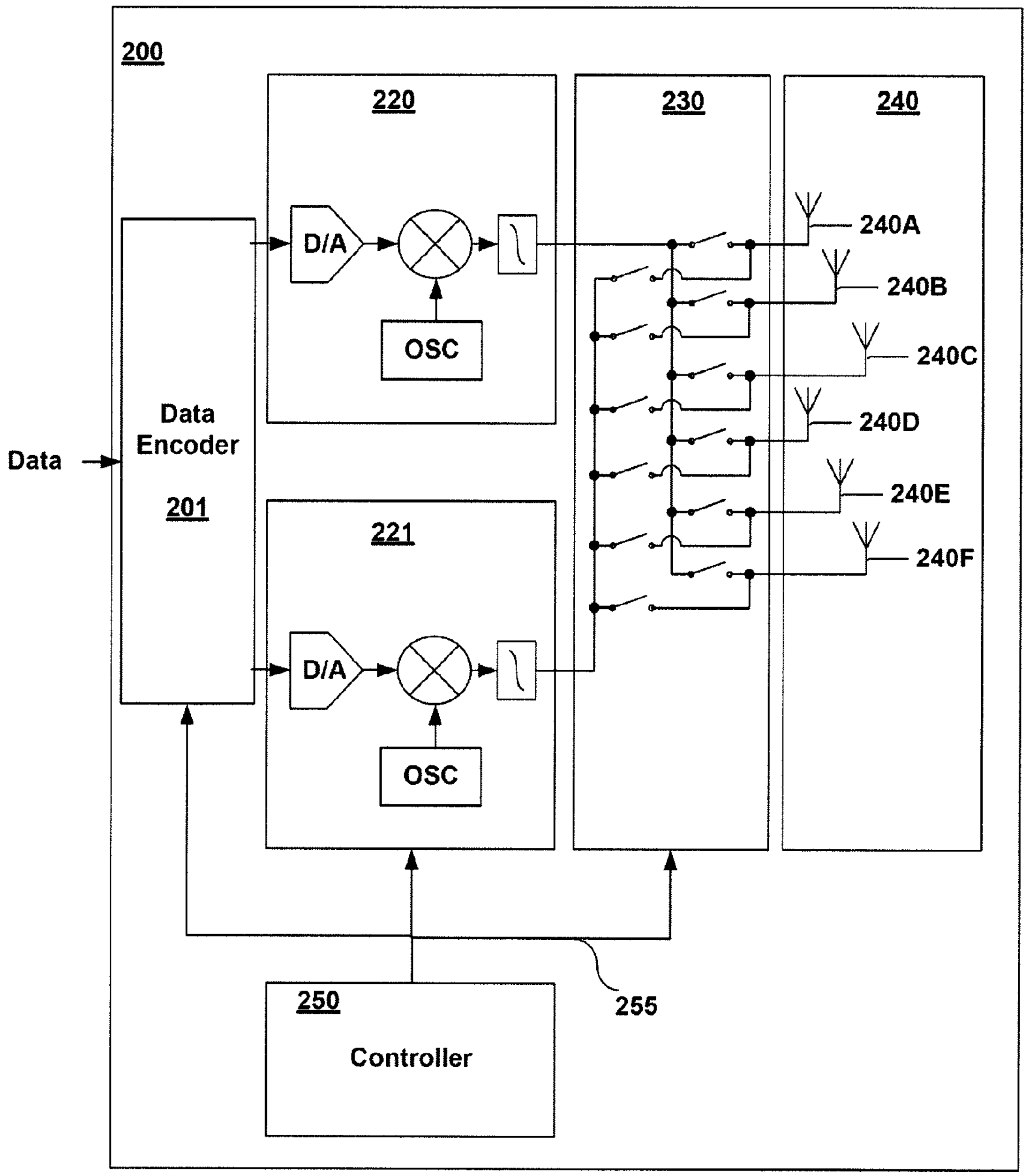
FIG. 2 illustrates a wireless MIMO antenna system having multiple antennas and multiple radios.

FIG. 2 illustrates a wireless MIMO antenna system having multiple antennas and multiple radios. The wireless MIMO antenna system 200 may be representative of a transmitter and/or a receiver such as an 802.11 access point or an 802.11 receiver. System 200 may also be representative of a set-top box, a laptop computer, television, Personal Computer Memory Card International Association (PCMCIA) card, Voice over Internet Protocol (VoIP) telephone, or handheld gaming device.

Wireless MIMO antenna system 200 may include a communication device for generating a radio frequency (RF) signal (e.g., in the case of transmitting node). Wireless MIMO antenna system 200 may also or alternatively receive data from a router connected to the Internet. Wireless MIMO antenna system 200 may then transmit that data to one or more of the remote receiving nodes. For example, the data may be video data transmitted to a set-top box for display on a television or video display.

The wireless MIMO antenna system 200 may form a part of a wireless local area network (e.g., a mesh network) by enabling communications among several transmission and/or receiving nodes. Although generally described as transmitting to a remote receiving node, the wireless MIMO antenna system 200 of FIG. 2 may also receive data subject to the presence of appropriate circuitry. Such circuitry may include but is not limited to a decoder, downconversion circuitry, samplers, digital-to-analog converters, filters, and so forth.

Wireless MIMO antenna system 200 includes a data encoder 201 for encoding data into a format appropriate for transmission to the remote receiving node via parallel radios 220 and 221. While two radios are illustrated in FIG. 2, additional radios or RF chains may be utilized. Data encoder 201 may include data encoding elements such as direct sequence spread-spectrum (DSSS) or Orthogonal Frequency Division Multiplex (OFDM) encoding mechanisms to generate baseband data streams in an appropriate format. Data encoder 201 may include hardware and/or software elements for converting data received into the wireless MIMO antenna system 200 into data packets compliant with the IEEE 802.11 format.

Radios 220 and 221 include transmitter or transceiver elements configured to upconvert the baseband data streams from the data encoder 201 to radio signals. Radios 220 and 221 thereby establish and maintain the wireless link. Radios 220 and 221 may include direct-to-RF upconverters or heterodyne upconverters for generating a first RF signal and a second RF signal, respectively. Generally, the first and second RF signals are at the same center frequency and bandwidth but may be offset in time or otherwise space-time coded.

Wireless MIMO antenna system 200 further includes a circuit (e.g., switching network) 230 for selectively coupling the first and second RF signals from the parallel radios 220 and 221 to an antenna apparatus 240 having multiple antenna elements 240A-F. Antenna elements 240A-F may include individually selectable antenna elements such that each antenna element 240A-F may be electrically selected (e.g., switched on or off). By selecting various combinations of the antenna elements 240A-F, the antenna apparatus 240 may form a "pattern agile" or reconfigurable radiation pattern. If certain or substantially all of the antenna elements 240A-F are switched on, for example, the antenna apparatus 240 may form an omnidirectional radiation pattern. Through the use of MIMO antenna architecture, the pattern may include both vertically and horizontally polarized energy, which may also be referred to as diagonally polarized radiation. Alternatively, the antenna apparatus 240 may form various directional radiation patterns, depending upon which of the antenna elements 240A-F are turned on.

Wireless MIMO antenna system 200 may also include a controller 250 coupled to the data encoder 201, the radios 220 and 221, and the circuit 230 via a control bus 255. The controller 250 may include hardware (e.g., a microprocessor and logic) and/or software elements to control the operation of the wireless MIMO antenna system 200.

The controller 250 may select a particular configuration of antenna elements 240A-F that minimizes interference over the wireless link to the remote receiving device. If the wireless link experiences interference, for example due to other radio transmitting devices, or changes or disturbances in the wireless link between the wireless MIMO antenna system 200 and the remote receiving device, the controller 250 may select a different configuration of selected antenna elements 240A-F via the circuit 230 to change the resulting radiation pattern and minimize the interference. For example, the controller 250 may select a configuration of selected antenna elements 240A-F corresponding to a maximum gain between the wireless system 200 and the remote receiving device. Alternatively, the controller 250 may select a configuration of selected antenna elements 240A-F corresponding to less than maximal gain, but corresponding to reduced interference in the wireless link.

Controller 250 may also transmit a data packet using a first subgroup of antenna elements 240A-F coupled to the radio 220 and simultaneously send the data packet using a second group of antenna elements 240A-F coupled to the radio 221. Controller 250 may change the group of antenna elements 240A-F coupled to the radios 220 and 221 on a packet-by-packet basis. Methods performed by the controller 250 with respect to a single radio having access to multiple antenna elements are further described in U.S. patent publication number US 2006-0040707 A1. These methods are also applicable to the controller 250 having control over multiple antenna elements and multiple radios.

A MIMO antenna apparatus may include a number of modified slot antennas and/or modified dipoles configured to transmit and/or receive horizontal polarization. The MIMO antenna apparatus may further include a number of modified dipoles to provide vertical polarization. Examples of such antennas include those disclosed in U.S. patent application Ser. No. 11/413,461. Each dipole and each slot provides gain (with respect to isotropic) and a polarized directional radiation pattern. The slots and the dipoles may be arranged with respect to each other to provide offset radiation patterns.

For example, if two or more of the dipoles are switched on, the antenna apparatus may form a substantially omnidirectional radiation pattern with vertical polarization. Similarly, if two or more of the slots are switched on, the antenna apparatus may form a substantially omnidirectional radiation pattern with horizontal polarization. Diagonally polarized radiation patterns may also be generated.

The antenna apparatus may easily be manufactured from common planar substrates such as an FR4 printed circuit board (PCB). The PCB may be partitioned into portions including one or more elements of the antenna apparatus, which portions may then be arranged and coupled (e.g., by soldering) to form a non-planar antenna apparatus having a number of antenna elements. In some embodiments, the slots may be integrated into or conformally mounted to a housing of the system, to minimize cost and size of the system, and to provide support for the antenna apparatus.

Figure 3A:
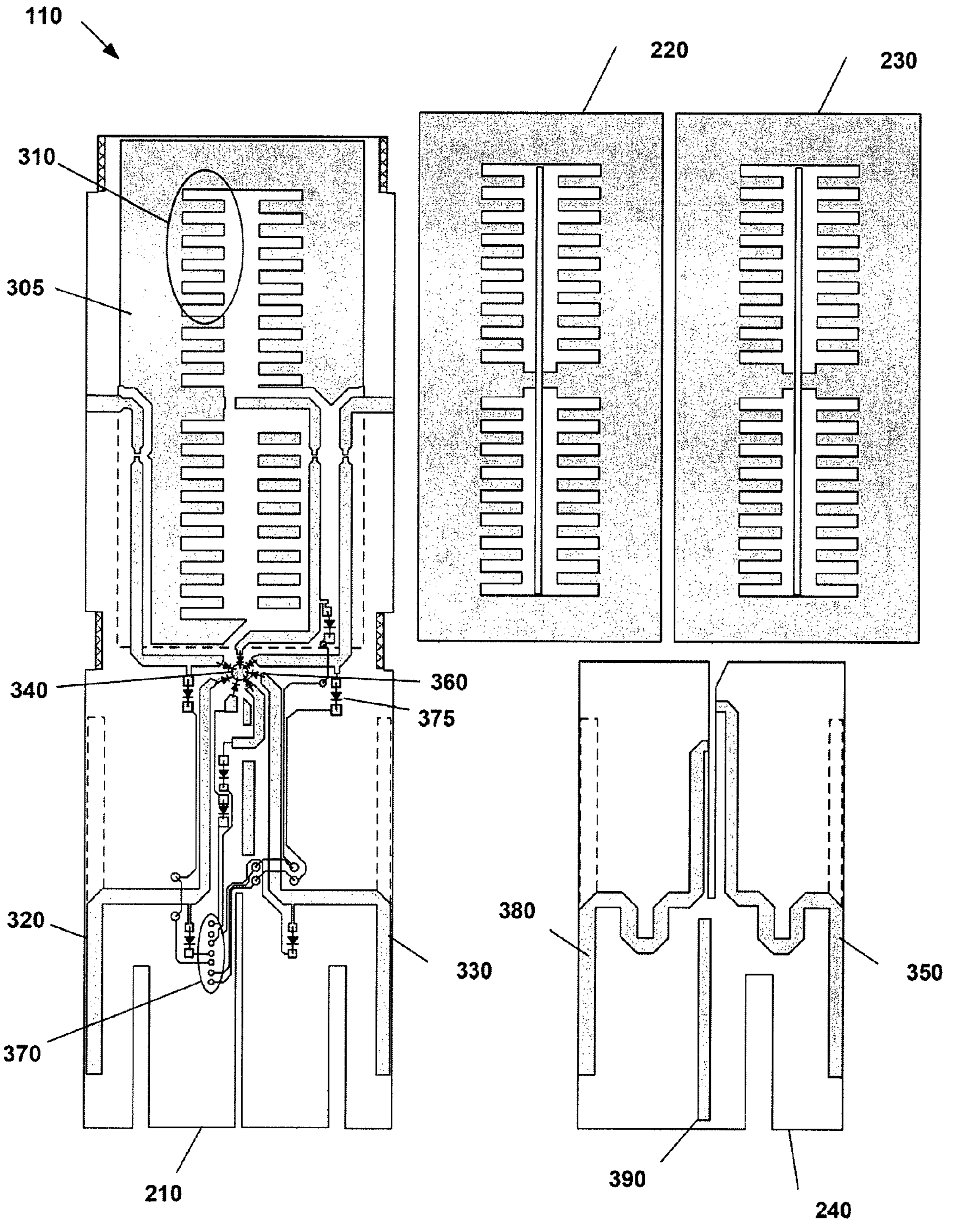
FIG. 3A illustrates PCB components for forming the slots, dipoles, and antenna element selector on the first side of a substrate in a MIMO antenna apparatus.

FIG. 3A illustrates PCB components for forming the slots, dipoles, and antenna element selector on the first side of a substrate in a MIMO antenna apparatus. PCB components on the second side of the substrates 210-240 (described with respect to FIG. 3B) are shown as dashed lines. The first side of the substrate 210 includes a portion 305 of a first slot antenna including "fingers" 310, a portion 320 of a first dipole, a portion 330 of a second dipole, and the antenna element selector (not labeled for clarity). The antenna element selector includes a radio frequency feed port 340 for receiving and/or transmitting an RF signal to a communication device and a coupling network for selecting one or more of the antenna elements.

The first side of the substrate 220 includes a portion of a second slot antenna including fingers. The first side of the substrate 230 also includes a portion of a third slot antenna including fingers. As depicted, to minimize or reduce the size of the MIMO antenna apparatus, each of the slots includes fingers. The fingers (sometimes referred to as loading structures) may be configured to slow down electrons, changing the resonance of each slot, thereby making each of the slots electrically shorter. At a given operating frequency, providing the fingers allows the overall dimension of the slot to be reduced, and reduces the overall size of the MIMO antenna apparatus.

The first side of the substrate 240 includes a portion 380 of a third dipole and portion 350 of a fourth dipole. One or more of the dipoles may optionally include passive elements, such as a director 390 (only one director shown for clarity). Directors include passive elements that constrain the directional radiation pattern of the modified dipoles, for example to increase the gain of the dipole. Directors are described in more detail in U.S. Pat. No. 7,292,198.

The radio frequency feed port 340 and the coupling network of the antenna element selector are configured to selectively couple the communication device to one or more of the antenna elements. A person of ordinary skill—in light of the present specification—will appreciate that many configurations of the coupling network may be used to couple the radio frequency feed port 340 to one or more of the antenna elements.

The radio frequency feed port 340 is configured to receive an RF signal from and/or transmit an RF signal to the communication device, for example by an RF coaxial cable coupled to the radio frequency feed port 340. The coupling network is configured with DC blocking capacitors (not shown) and active RF switches 360 to couple the radio frequency feed port 340 to one or more of the antenna elements.

The RF switches 360 are depicted as PIN diodes, but may comprise RF switches such as gallium arsenide field-effect transistors (GaAs FETs) or virtually any RF switching device. The PIN diodes comprise single-pole single-throw switches to switch each antenna element either on or off (i.e., couple or decouple each of the antenna elements to the radio frequency feed port 340). A series of control signals may be applied via a control bus 370 to bias each PIN diode. With the PIN diode forward biased and conducting a DC current, the PIN diode switch is on, and the corresponding antenna element is selected. With the diode reverse biased, the PIN diode switch is off. In some embodiments, one or more light emitting diodes (LEDs) 375 may be included in the coupling network as a visual indicator of which of the antenna elements is on or off. An LED may be placed in circuit with the PIN diode so that the LED is lit when the corresponding antenna element is selected.

Figure 3B:
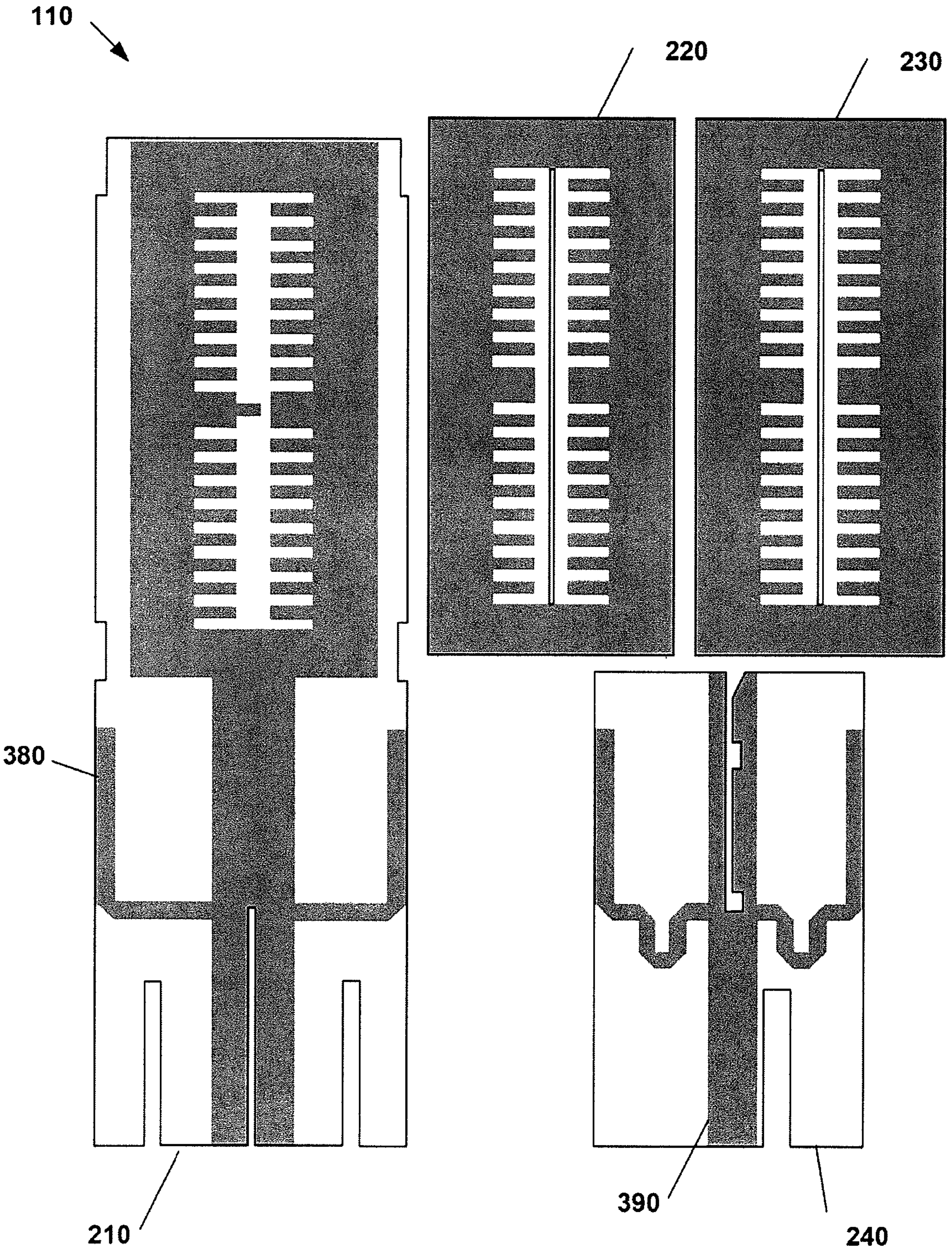
FIG. 3B illustrates PCB components for forming the slots, dipoles, and antenna element selector on the second side of a substrate in a MIMO antenna apparatus.

FIG. 3B illustrates PCB components (not to scale) for forming the slots, dipoles, and antenna element selector on the second side of the substrates that may be used in forming a MIMO antenna apparatus. PCB components on the first side of the substrates 210-240 (described with respect to FIG. 3A) are not shown for clarity.

On the second side of the substrates 210-240, the antenna apparatus 110 includes ground components configured to 'complete' the dipoles and the slots on the first side of the substrates 210-240. For example, the portion of the dipole 320 on the first side of the substrate 210 (FIG. 3A) is completed by the portion 380 on the second side of the substrate 210 (FIG. 3B). The resultant dipole provides a vertically polarized directional radiation pattern substantially in the plane of the substrate 210.

Optionally, the second side of the substrates 210-240 may include passive elements for modifying the radiation pattern of the antenna elements. Such passive elements are described in detail in U.S. Pat. No. 7,292,198. Substrate 240 includes a reflector 390 as part of the ground component. The reflector 390 is configured to broaden the frequency response of the dipoles.

Figure 4:
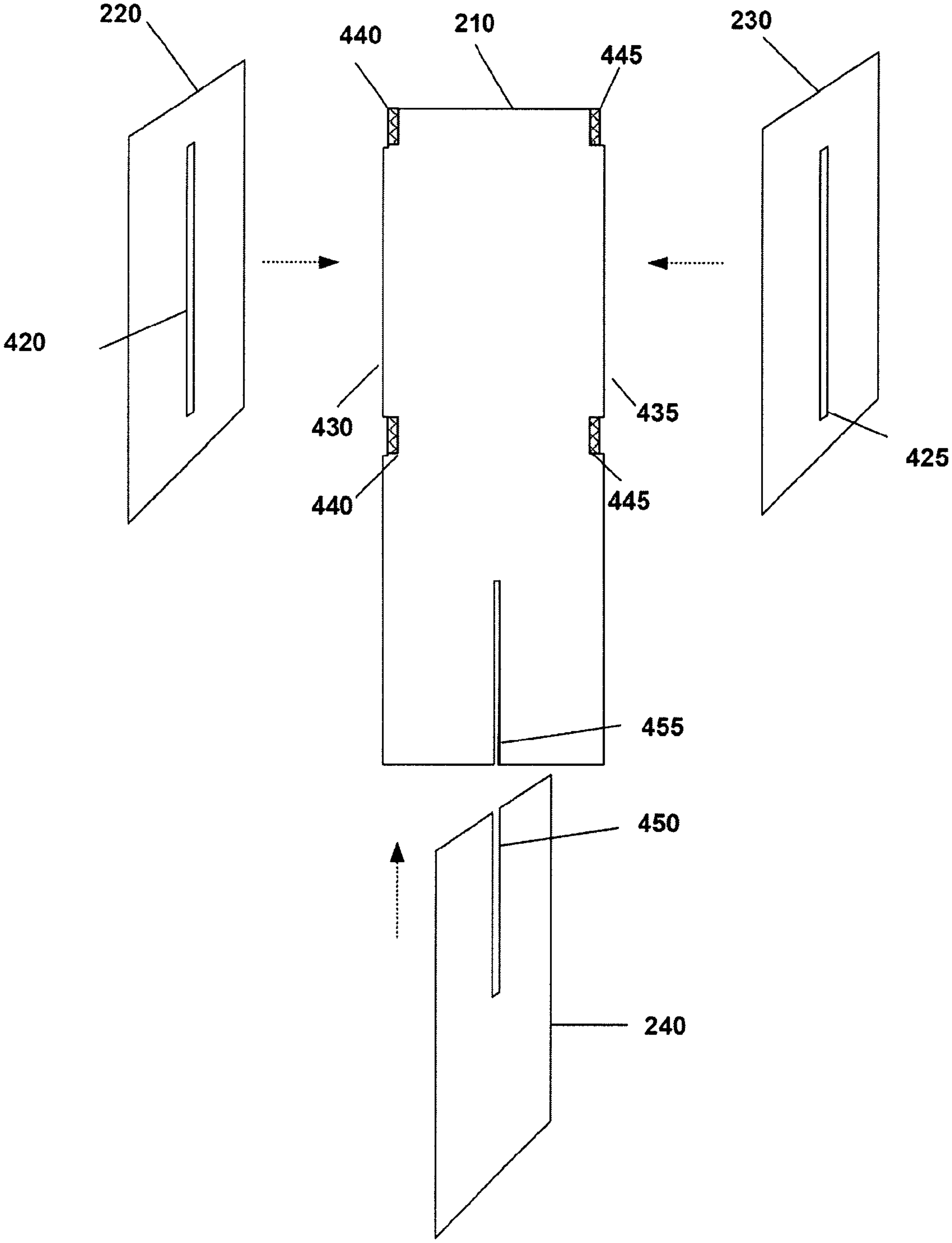
FIG. 4 illustrates an exploded view to show a method of manufacture as may be implemented with respect to a MIMO antenna apparatus.

FIG. 4 illustrates an exploded view to show a method of manufacture as may be implemented with respect to a MIMO antenna apparatus. As shown in FIG. 4, substrates 210-240 are first formed from a single PCB. The PCB may comprise a part of a large panel upon which many copies of the substrates 210-240 are formed. After being partitioned from the PCB, the substrates 210-240 are oriented and affixed to each other.

An aperture (slit) 420 of the substrate 220 is approximately the same width as the thickness of the substrate 210. The slit 420 is aligned to and slid over a tab 430 included on the substrate 210. The substrate 220 is affixed to the substrate 210 with electronic solder to the solder pads 440. The solder pads 440 are oriented on the substrate 210 to electrically and/or mechanically bond the slot antenna of the substrate 220 to the coupling network and/or the ground components of the substrate 210.

Alternatively, the substrate 220 may be affixed to the substrate 210 with conductive glue (e.g., epoxy) or a combination of glue and solder at the interface between the substrates 210 and 220. Affixing the substrate 220 to the substrate 210 with electronic solder at the solder pads 440 has the advantage of reducing manufacturing steps, since the electronic solder can provide both a mechanical bond and an electrical coupling between the slot antenna of the substrate 220 and the coupling network of the substrate 210.

To affix the substrate 230 to the substrate 210, an aperture (slit) 425 of the substrate 230 is aligned to and slid over a tab 435 included on the substrate 210. The substrate 230 is affixed to the substrate 210 with electronic solder to solder pads 445, conductive glue, or a combination of glue and solder.

To affix the substrate 240 to the substrate 210, a mechanical slit 450 of the substrate 240 is aligned with and slid over a corresponding slit 455 of the substrate 210. Solder pads (not shown) on the substrate 210 and the substrate 240 electrically and/or mechanically bond the dipoles of the substrate 240 to the coupling network and/or the ground components of the substrate 210.

Alternative embodiments may vary the dimensions of the antenna apparatus for operation at different operating frequencies and/or bandwidths. For example, with two radio frequency feed ports and two communications devices, the antenna apparatus may provide operation at two center frequencies and/or operating bandwidths. Further, to minimize or reduce the size of the antenna apparatus, the dipoles may optionally incorporate one or more fingers/loading structures as described in U.S. patent publication number US-2006-0038735 and that slow down electrons, changing the resonance of the dipole, thereby making the dipole electrically shorter. At a given operating frequency, providing the finger/loading structures allows the dimensions of the dipole to be reduced. To still further reduce the size of the antenna apparatus, the ½-wavelength slots may be "truncated" to create, for example, ¼-wavelength modified slot antennas. The ¼-wavelength slots provide a different radiation pattern than the ½-wavelength slots.

Although the antenna apparatus has been described here as having four dipoles and three slots, more or fewer antenna elements are also contemplated and may depend upon a particular MIMO antenna configuration. One skilled in the art—and in light of the present specification—will appreciate that providing more antenna elements of a particular configuration (more dipoles, for example), yields a more configurable radiation pattern formed by the antenna apparatus. An advantage of the foregoing is that in some embodiments the antenna elements of the antenna apparatus may each be selectable and may be switched on or off to form various combined radiation patterns for the antenna apparatus.

Further, the antenna apparatus may include switching at RF as opposed to switching at baseband. Switching at RF means that the communication device requires only one RF up/downconverter. Switching at RF also requires a significantly simplified interface between the communication device and the antenna apparatus. For example, the antenna apparatus provides an impedance match under all configurations of selected antenna elements, regardless of which antenna elements are selected.

An advantage of the foregoing is that the antenna apparatus or elements thereof may be embodied in a three-dimensional manufactured structure as described with respect to various MIMO antenna configurations. In these MIMO antenna systems, multiple parallel communication devices may be coupled to the antenna apparatus. In such an embodiment, the horizontally polarized slots of the antenna apparatus may be coupled to a first of the communication devices to provide selectable directional radiation patterns with horizontal polarization, and the vertically polarized dipoles may be coupled to the second of the communication devices to provide selectable directional radiation patterns with vertical polarization. The antenna feed port 340 and associated coupling network of FIG. 3A may be modified to couple the first and second communication devices to the appropriate antenna elements of the antenna apparatus. In this fashion, the system may be configured to provide a MIMO capable system with a combination of directional to omnidirectional coverage as well as horizontal and/or vertical polarization.

Figure 5:
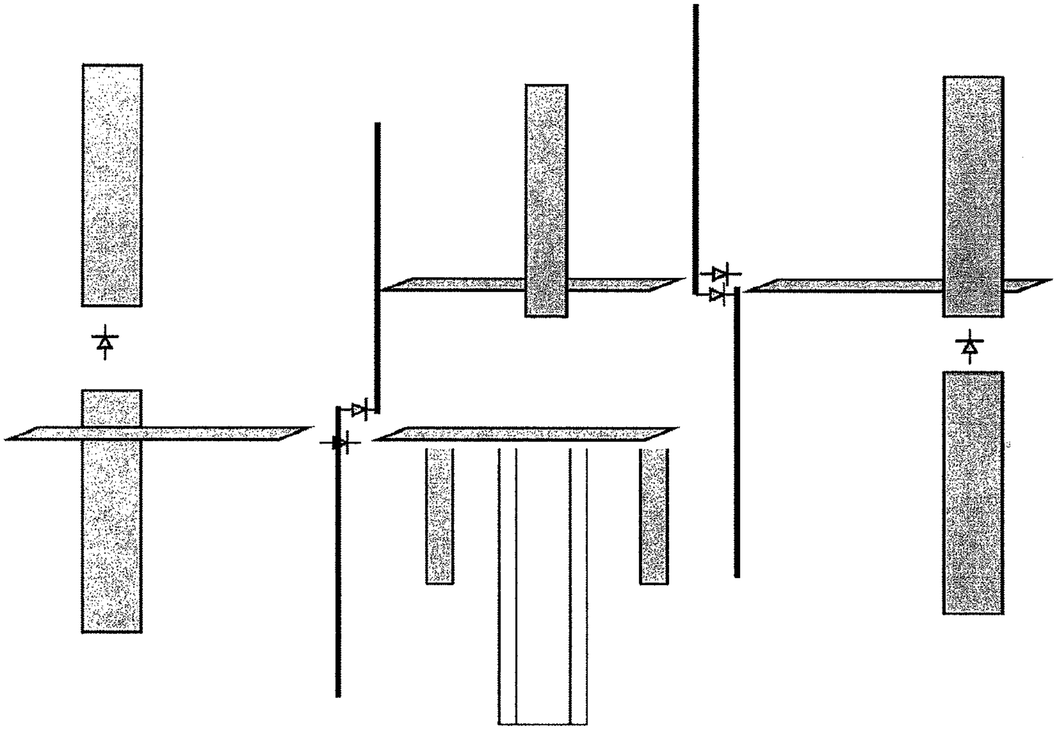
FIG. 5 illustrates a MIMO antenna apparatus that occupies a cubic space.

FIG. 5 illustrates a MIMO antenna apparatus that occupies a cubic space. A cubic antenna apparatus configuration like that of FIG. 5 may include perpendicular cut boards. Any related antenna elements and dipoles may be re-joined utilizing a mating tab, which may include a series of vias. By soldering the mating tabs, the cut elements may be coupled and rejoined. Control lines off-board may be cut and recoupled in a similar fashion. The antenna apparatus of FIG. 5 may be mounted, for example, with a 45 degree tilt. In the embodiment illustrated in FIG. 5, the antenna includes three dipole elements. Each dipole elements is orthogonal to each of the others.

Parasitic elements may be positioned about the dipoles of the antenna apparatus of FIG. 5. Certain of the parasitic elements (e.g., half) may be of different polarizations. Switching elements may change the length of the parasitic elements thereby making them transparent to radiation. Alternatively, the switching elements may change the length of the parasitic elements such that they reflect that energy back toward a driven dipole resulting in higher gain in that direction. High gain, switched omnidirectional coverage may be obtained in this manner for all polarizations. Further, high gain patterns may be generated in the same or differing directions. The elements may be switched on or off and thereby become a reflector or director (depending on the length of the element) by offsetting and coupling two physically distinct elements with a PIN diode.

Figure 6A:
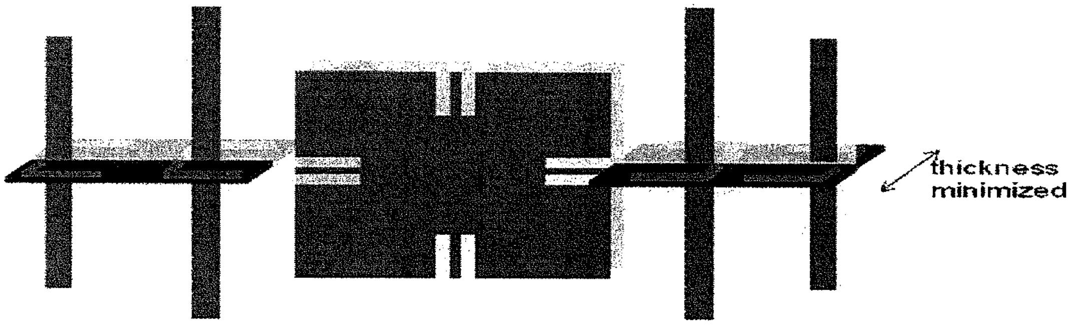
FIG. 6A illustrates a horizontally narrow embodiment of a MIMO antenna apparatus.
Figure 6B:
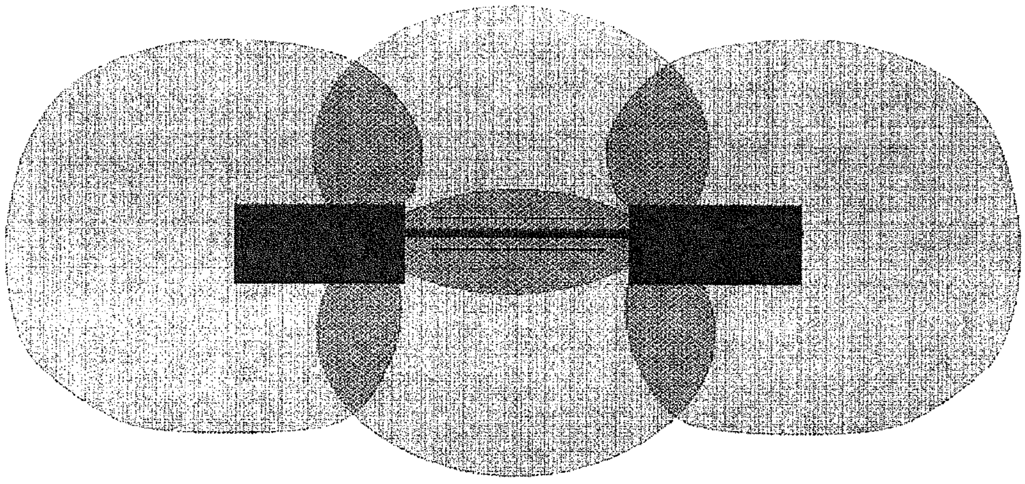
FIG. 6B illustrates a top plan view of a radiation pattern that might be generated by the horizontally narrow MIMO antenna apparatus of FIG. 6A.

FIG. 6A illustrates a horizontally narrow embodiment of a MIMO antenna apparatus. The embodiment illustrated in FIG. 6A includes Yagi end-fire elements with surface mount broadside-fire patch elements. The antenna apparatus of FIG. 6A is tall but thin for vertically oriented enclosures. FIG. 6B illustrates a top view of a radiation pattern that might be generated the horizontally narrow antenna apparatus of FIG. 6A. Each pattern contains both polarizations and is coupled to a different radio.

The end-fire Yagis of FIG. 6A are orthogonally polarized to each other. The patches are dual-fed such that orthogonal polarization fields are excited. The patches are of a shape to be easily surface-mountable and mechanically stable by bending down feeding tabs. Perpendicular Yagis may be attached through vias with double pads for elements with a cut.

Figure 7A:
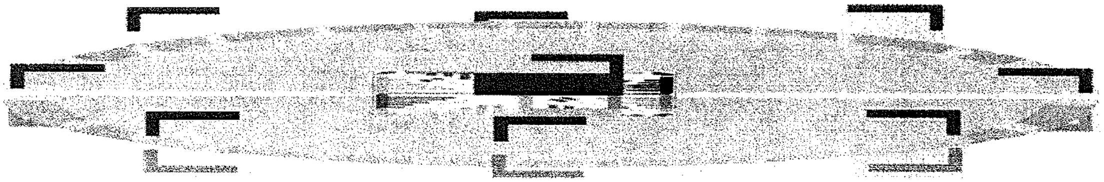
FIG. 7A illustrates an embodiment of a vertically narrow MIMO antenna apparatus.
Figure 7B:
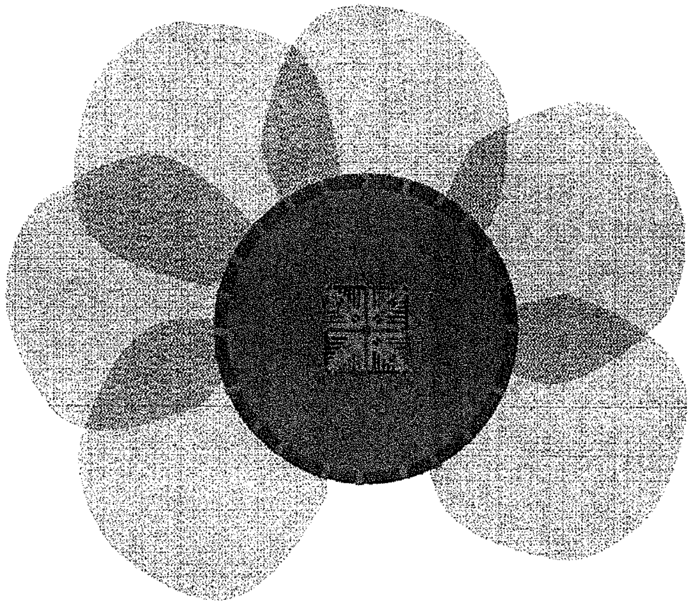
FIG. 7B illustrates a top plan view of a radiation pattern that might be generated by the vertically narrow MIMO antenna apparatus of FIG. 7A.

FIG. 7A illustrates an embodiment of a vertically narrow antenna apparatus. FIG. 7B illustrates a corresponding radiation pattern as may be generated by the embodiment illustrated in FIG. 7A. In the embodiment illustrated in FIG. 7A, horizontally polarized parasitic elements may be positioned about a central omnidirectional antenna. All elements (i.e., the parasitic elements and central omni) may be etched on the same PCB to simplify manufacturability. Switching elements may change the length of parasitic thereby making them transparent to radiation. Alternatively, switching elements may cause the parasitic elements to reflect energy back towards the driven dipole resulting in higher gain in that direction. An opposite parasitic element may be configured to function as a direction to increase gain.

For vertical polarization, three parallel PCBs may be used with etched elements. The middle vertical PCB may be driven with two switched reflectors. The remaining two PCBs may contain the reflector elements, spaced such that PIN diode switches can go onto the main, horizontal board. High gain switched omnidirectional coverage may be obtained in this manner for all polarizations. Alternatively, high gain patterns may be in the same or differing directions.

The invention has been described herein in terms of several preferred embodiments. Other embodiments of the invention, including alternatives, modifications, permutations and equivalents of the embodiments described herein, will be apparent to those skilled in the art from consideration of the specification, study of the drawings, and practice of the invention. The embodiments and preferred features described above should be considered exemplary, with the invention being defined by the appended claims, which therefore include all such alternatives, modifications, permutations and equivalents as fall within the true spirit and scope of the present invention.

What is claimed is:

1. A multiple-input multiple-output (MIMO) antenna system, comprising:

a data encoder that encodes data to be transmitted to a receiving node via radio transmission;

a plurality of parallel radios coupled to the data encoder, wherein each of the plurality of parallel radios upconverts the data from the encoders into RF signals;

a MIMO antenna apparatus including a first plurality of antenna elements that each generate a horizontal radiation pattern when selectively coupled to the plurality of parallel radios and a second plurality of antenna elements that each generate a vertical radiation pattern when selectively coupled to the plurality of parallel radios, wherein the plurality set of antenna elements disposed separately from the second plurality of antenna elements, wherein the first plurality of antenna elements are formed as slots on a printed circuit board (PCB), each slot including a plurality of fingers to change resonance and reduce a size of said each slot, and wherein the second plurality of antenna elements are formed as dipoles on the PCB; and a controller for selectively coupling each of the first and second plurality of antenna elements to one or more of the parallel radios, wherein when two or more of the first plurality of antenna elements are selected, the MIMO antenna apparatus forms a substantially omnidirectional radiation pattern with horizontal polarization, and when two or more of the second plurality of antenna elements are selected, the MIMO antenna apparatus forms a substantially omnidirectional radiation pattern with vertical polarization.

2. The MIMO antenna system of claim 1, wherein each of the antenna elements is coupled to a radio frequency (RF) switch comprising one or more diodes.

3. The MIMO antenna system of claim 1, further comprising a plurality of parasitic elements.

4. The MIMO antenna system of claim 3, further comprising an omnidirectional antenna, wherein the plurality of parasitic elements is positioned around the omnidirectional antenna.

5. The MIMO antenna system of claim 3, wherein one or more of the plurality of parasitic elements are selected by a switching element to reflect a radiation pattern of the omnidirectional antenna.

6. The MIMO antenna system of claim 3, wherein one or more of the plurality of parasitic elements are selected by a switching element to redirect a radiation pattern of the omnidirectional antenna.

7. The MIMO antenna system of claim 3, wherein one or more of the series of parasitic elements are coupled to a switching element, the switching element changing the length of the one or more of the series of parasitic elements thereby making the one or more of the series of parasitic elements transparent to radiation.

8. The MIMO antenna system of claim 7, wherein the reflection of radiation by the one or more of the series of parasitic elements increases the gain of directional radiation pattern generated by the MIMO antenna apparatus.

9. A multiple-input multiple-output (MIMO) antenna apparatus, comprising:

a substrate defining a vertical space within a housing;

a first plurality of antenna elements selectively coupled to a first radio, wherein the first plurality of antenna elements generates a first directional radiation pattern via an RF signal received from a radio frequency feed port, the first plurality of antenna elements corresponding to a first polarization and located on the substrate, wherein the first plurality of antenna elements are formed as slots on a printed circuit board (PCB), each slot including a plurality of fingers to change resonance and reduce a size of said each slot;

a second plurality of antenna elements selectively coupled to a second radio, wherein the second plurality of antenna elements generates a second directional radiation pattern via an RF signal received from the radio frequency feed port, the second plurality of antenna elements corresponding to a second polarization and located on the substrate, the first plurality of antenna elements and second plurality of antenna elements occupying a vertical space, wherein the first and second radio collectively generate an omnidirectional and diagonally polarized radiation pattern through the selective coupling of the first and second plurality of antenna elements to the radio frequency feed port wherein the second plurality of antenna elements are formed as dipoles on the PCB;

antenna selector elements selectively coupling the first and second plurality of antenna elements to the radio frequency feed port;

a controller for controlling the antenna selector elements to selectively coupling each of the first and second plurality of antenna elements to respective radio, wherein when two or more of the first plurality of antenna elements are selected, the MIMO antenna apparatus forms a substantially omnidirectional radiation pattern with the first polarization, and when two or more of the second plurality of antenna elements are selected, the MIMO antenna apparatus forms a substantially omnidirectional radiation pattern with the second polarization; and a coupling network, the coupling network including a control bus that receives a control signal for biasing the one or more antenna selector elements.

10. The MIMO antenna apparatus of claim 9, further comprising one or more parasitic antenna elements located on the substrate and coupled to the coupling network, the coupling network biasing the one or more parasitic antenna elements.

11. The MIMO antenna apparatus of claim 10, wherein the one or more parasitic antenna elements are biased to operate as a reflector.

12. The MIMO antenna apparatus of claim 10, wherein the one or more parasitic antenna elements are biased to operate as a director.

13. The MIMO antenna apparatus of claim 10, wherein the one or more parasitic elements are selectively coupled to one another via a switching network, the switching network receiving a control signal for coupling one or more of the parasitic elements to one another, thereby changing the length of the one or more parasitic elements and influencing the directional radiation pattern emitted by the first radio or the second radio.

14. The MIMO antenna apparatus of claim 9, wherein the coupling network includes a series of diodes for selectively coupling antenna elements to the radio frequency feed port.

15. The MIMO antenna apparatus of claim 14, wherein one or more of the diodes from the series of diodes is a p-type, intrinsic, n-type (PIN) diode.

16. The MIMO antenna apparatus of claim 9, wherein the coupling network includes a series of gallium arsenide field-effect transistors (GaAs FETs) for selectively coupling the antenna elements to the radio frequency feed port.

17. The MIMO antenna apparatus of claim 9, wherein the coupling network further includes one or more light emitting diodes (LEDs) placed in circuit with an antenna element such that the selection of an associated antenna element illuminates the LED.

18. The MIMO antenna apparatus of claim 9, wherein the directional radiation pattern of the first radio has a horizontal polarization and the directional radiation pattern of the second radio has a vertical polarization.

19. The MIMO antenna apparatus of claim 9, wherein the directional radiation pattern of the first radio and the directional radiation pattern of the second radio are opposite one another.

20. The MIMO antenna apparatus of claim 9, wherein the directional radiation pattern of the first radio and the directional radiation pattern of the second radio partially overlap one another.

21. The MIMO antenna apparatus of claim 9, wherein the directional radiation pattern of the first radio and the directional radiation pattern of the second radio form a substantially omnidirectional radiation pattern.

* * * * *